July 13, 1965 J. V. SCATTAGLIA 3,194,980

TIMING OF PULSE REGENERATION

Filed Oct. 20, 1961 2 Sheets-Sheet 1

INVENTOR
J. V. SCATTAGLIA
BY Harry C. Hart
ATTORNEY

July 13, 1965 J. V. SCATTAGLIA 3,194,980

TIMING OF PULSE REGENERATION

Filed Oct. 20, 1961 2 Sheets-Sheet 2

INVENTOR
J. V. SCATTAGLIA
BY Harry C. Hart
ATTORNEY

United States Patent Office 3,194,980
Patented July 13, 1965

3,194,980
TIMING OF PULSE REGENERATION
James V. Scattaglia, Plainfield, N.J., assignor to Bell Telephone Laboratories, Incorporated, New York, N.Y., a corporation of New York Filed Oct. 20, 1961, Ser. No. 146,656
16 Claims. (Cl. 307—88.5)

This invention relates to the regeneration of pulse signals and, more particularly, to the timed regeneration of bipolar pulse signals.

Regeneration entails the restoration of pulse signals that become distored and attenuated during transmission. Typically, the restoration is initiated at a repeater each time an incoming pulse signal exceeds a prescribed threshold level. Unfortunately, the threshold may also be exceeded by a spurious signal, such as that created by a spontaneous noise disturbance. To reduce the possibility of spurious regeneration, the pulse signals applied to the repeater are coordinated with a timing wave whose frequency corresponds to the maximum pulse repetition rate.

The timing wave either accompanies a pulse train or is, derived from it at the repeater. When the pulse signals are bipolar, i.e., alternately positive and negative, the train has a spectral null which can readily accommodate the timing wave. Or, the timing wave can be derived by the full wave rectification of a portion of the bipolar pulse energy. In either case, aside from polarty, the regenerated signals should be substantially alike. Otherwise, any asymmetry can cause, for example, a parasitic signal component at the timing wave frequency and short-duration steady signal components that produce interpulse interference. As a result, an arrangement which is adequate for ordinary pulse regeneration, such as that provided by relaxation oscillators, may require excessive adjustment to meet the symmetry requirement of bipolar pulse regeneration.

Accordingly, it is an object of the invention to accomplish the symmetrical regeneration of bipolar pulse signals. A related object is to accomplish bipolar regeneration without using relaxation oscillators.

For the sake of compactness, pulse repeaters are advantageously transistorized. Then, the rate at which pulse signals can be regenerated is limited by the "hole" storge phenomenon of transistor elements. At the same time, the energy of a timing wave derived from incoming pulse signals is necessarily limited. Hence, it is an object of the invention to extend the rate at which bipolar pulse signals can be regenerated while simultaneously providing for the derivation of an amplified timing wave. A concurrent object of the invention is to achieve timing wave amplification and repeater current limiting with a single transistor.

Since the pulse signals applied to a repeater are of varying density, dependent upon the nature of the information being transmitted, the timing wave derived from such signals is of a varying amplitude. This has the effect of producing jitter in the regenerated pulse signals. Consequently, it is another object of the invention to stabilize the amplitude of a timing wave derived from an incoming pulse train.

According to the invention, the foregoing and related objects are accomplished by a push-pull repeater having a timing path that includes a timing transistor. The timing transistor is used in deriving an amplified timing wave from incoming bipolar pulse signals and, simultaneously, for limiting the current flowing to the push-pull repeater elements, thus curtailing hole storage and permitting a transistorized repeater to operate at high pulse repetition rates. To make the regeneration substantially independent of incoming pulse density, the timing wave path advantageously includes a zero crossing detector.

It is a feature of the invention that a hybrid branching filter can be used either to prevent interference with a derived timing wave or to extract, from an incoming pulse train, a timing wave that is accommodated by a spectral null of the train. By balanced design of the filter transformer the timing wave is extracted without detriment to the pulse signals of the train even at high pulse repetition rates.

Other features of the invention will become apparent after the consideration of an illustrative embodiment taken in conjunction with the drawings in which:

FIGS. 2A through 2G–2 are a set of waveform diagrams explanatory of the regenerative network of FIG. 1.

Figure 1:
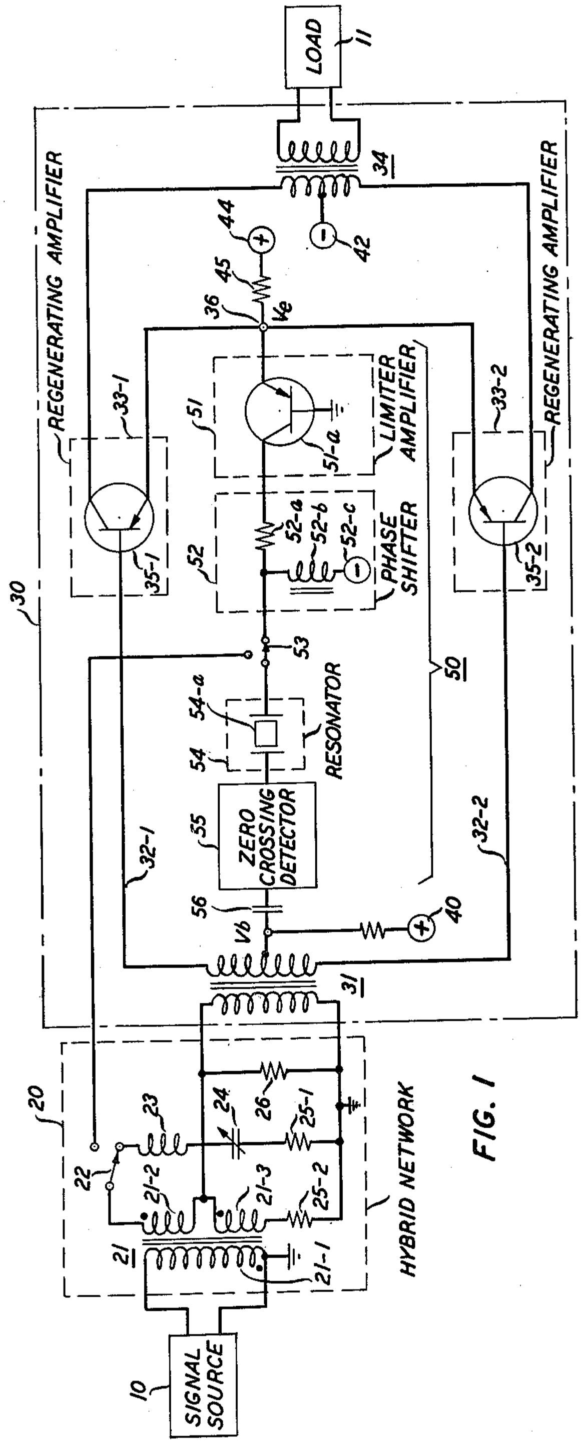
FIG. 1 is a schematic diagram of a regenerative network incorporating a push-pull repeater.

Turn now to the regenerative network of FIG. 1. Bipolar pulse signals, originating at a source 10 and intended for a load 11, are applied through a hybrid network 20 to a push-pull repeater 30.

Figure 2A:
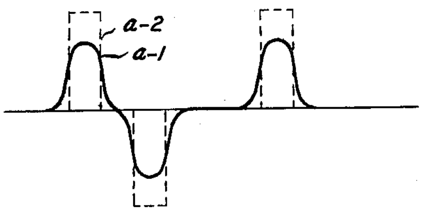

For the moment, bypass the hybrid network, with its internal switch 22 set as shown in FIG. 1, and consider the repeater, with its internal switch 53 set as shown in FIG. 1. As will be demonstrated shortly, the pulse train at the input transformer 31 of the repeater is substantially the same as at the input to the hybrid network. A portion of such a train is indicated in FIG. 2A by the incoming signal waveform *a*–1 for which equalization has been assumed.

Since the pulse signals of the train are bipolar, the repeater is advantageously of the push-pull variety. Hence, there are two shunt-connected regenerating paths 32–1 and 32–2 that extend from the input transformer and contain respective amplifiers 33–1 and 33–2, one for pulse signals of each polarity. Once regenerated, the pulse signals pass from the amplifiers to the load by way of an output transformer 34.

To facilitate miniaturization, the amplifiers are constituted of transistors 35–1 and 35–2 whose base and collector electrodes are respectively interconnected by the input and output transformers. The emitter electrodes of the transistors are tied to a common terminal point 36 of the regenerating paths.

Bias voltages for the transistors are supplied in common. A base bias voltage $V_b$ is established by a first source 40 resistively connected to the input transformer. Similarly, a second source 42 provides a collector bias voltage at the output transformer. In addition, a resistively coupled third source 44 is responsible for an emitter bias voltage $V_e$ at the common point 36.

Figure 2B:
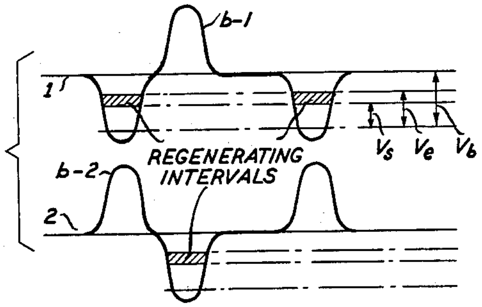
Figure 2C:
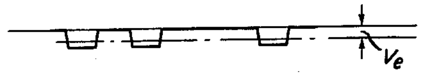
Figure 2D:
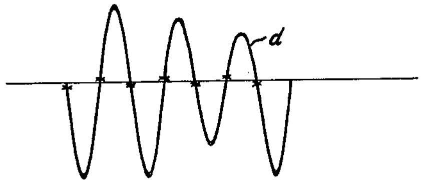
Figure 2E:
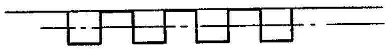

To prevent regeneration in the absence of an incoming pulse train, the magnitude of the base bias voltage $V_b$ is arranged to be greater than that of the emitter bias voltage $V_e$. Then the pulses of an incoming train are positioned about the base bias voltage level $V_b$, as shown in FIGS. 2B–1 and 2B–2 for the respective transistor amplifiers. Each time the base voltage of either transistor 35–1 or 35–2 reaches the emitter bias level $V_e$, the transistor is at its threshold of conduction and a regenerating interval begins. As the base voltage decreases a corresponding change in signal level takes place at the output transformer until the base voltage reaches the saturation voltage level $V_s$ after which the output signal level is of constant amplitude.

Ideally the regenerated pulse train has the waveform *a*–2 shown in FIG. 2A along with the incoming waveform *a*–1 for comparison. The pulses of the ideal waveform are characterized by steep sides and flat tops. A steep side corresponds to a rapid transition, at the common point 36, from the threshold level $V_e$ of the emitter bias voltage to the saturation level $V_s$. A flat top is obtained when the transistor draws saturation current over the pulse interval.

Rapid rise times require that the transistors be in a high gain configuration. But in that case, the saturation currents become excessive and produce a significant amount of "hole" storage that curtails the rate at which the repeater can be used to regenerate the signals of the incoming train. On the other hand, if the gain is reduced to limit saturation current, and thereby avoid excessive "hole" storage, the rise and fall times become appreciable and the regenerated pulse signals have insufficiently steep leading and trailing edges.

For the repeater of FIG. 1, the gain requirement is met when the transistors are in a grounded emitter configuration, i.e., the impedance of the emitter-to-ground path is of a negligible magnitude approaching zero. But an appreciable emitter-to-ground impedance is desirable in order to limit saturation current and to prevent hole storage. Then the gain of the amplifier is sharply reduced.

The diverse requirements of high gain and saturation current limitation could be achieved by controlling the magnitude of the bias resistor 45 at the common point 36. Instead, however, the invention accomplishes this result by using a grounded base transistor 51–*a* with its emitter electrode connected to the common point. Then, absent an incoming pulse signal, substantially all of the current supplied by the emiter bias source 44 flows in the emitter-base path of the grounded-base transistor 51–*a* and the emitter bias voltage is at a low magnitude level determined by the impedance of the emitter-base path so that the regenerating transistors 35–1 and 35–2 are substantially in the grounded emitter configuration. When an incoming signal causes the base voltage of either regenerating transistor to fall below the emitter voltage, the emitter-base current of the grounded-base transistor 51–*a* is rapidly diverted, causing the emitter voltage to reach the negative level indicated in FIG. 2C. At this point, the grounded base transistor is cut off so that the emitter-to-ground impedance of the regenerating transistors becomes that of the bias resistor 45, providing substantial feedback and limiting the saturation currents accordingly.

Thus far the timing of the repeater has not been considered. According to the invention, the transistor 51–*a* that is used for limiting the saturation current is also used in deriving an amplified timing signal in a timing path 50 which extends from the transistor 51–*a* to the input transformer 31. Included in tandem connection in the timing path are a phase shifter 52, a selector switch 53, and a resonator 54.

The phase shifter 52 is constituted of a resistor 52–*a* and a choke coil 52–*b* connected to a source 52–*c* of collector bias voltage for the timing transistor 51–*a*. As the incoming pulse signals successively change the emitter voltage level of the timing transistor (see FIG. 2C), a corresponding, but amplified, change occurs at the collector electrode. With each change in collector signal level the resonator 54, desirably a crystal 54–*a*, is excited under the control of the phase shifter to produce a sinusoidal waveform of the kind shown in FIG. 2D. Since the incoming pulse signals do not occur at the pulse repetition rate, this waveform is exponentially damped and, taken alone, would be unsatisfactory for timing.

To render the resonator waveform adequate for timing, a clamping circuit (not shown) may be included with the base bias source 40.

However, it is preferable to use a zero crossing detector 55 in the timing path. When the detector is a Schmidt trigger such as that disclosed on p. 6–63 of "A Handbook of Semi-Conductor Circuits" by Schwartz, Department of the Navy (1959), it is operated at the "*x*" points of the resonator waveform and reshaped according to FIG. 2E into a sustained pulse train with substantially identical pulse intervals.

Figure 2F:
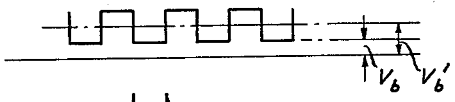
Figure 2G:
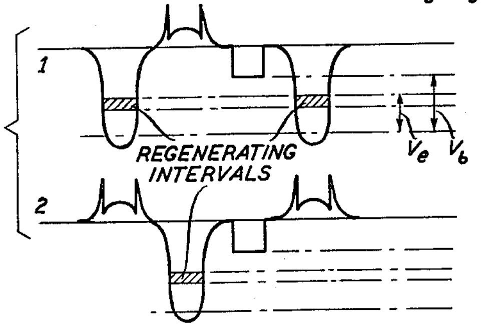

Because of a coupling capacitor 56 between the zero crossing detector 55 and the input transformer 31, the reshaped timing wave is positioned, in accordance with FIG. 2F, about a modified base bias level $V'_b$ that is obtained by increasing the voltage of the first source 40. Subsequently, the timing wave supplements the pulse signals applied to the respective transistors in the manner indicated by FIGS. 2G–1 and 2G–2. As a result the regenerating intervals become uniform and the regenerated pulse train at the load has substantially the ideal waveform *a*–2 of FIG. 2A.

Thus, the limiter-amplifier 51 containing the transistor 51–*a* serves a dual role. It limits the saturation currents supplied to the regenerating transistors and simultaneously derives an amplified timing wave from an incoming pulse train.

Since the derived timing wave supplements the incoming pulse train at the input transformer, any component of the train at the timing wave frequency could interfere with the timing. Such a component, originating with a prior asymmetric regeneration of the train, is prevented from appearing at the input transformer by the intervening hybrid network 20 between the source 10 and the input transformer 31 (see FIG. 1).

Central to the hybrid network 20 is a balanced three-winding transformer 21 whose upper secondary winding 21–2 is connected through a selector switch 22 to a resonant circuit desirably constituted an inductor 23 connected in series with a variable capacitor 24. Also included with the resonant circuit is a resistor 25–1, whose magnitude is balanced by a corresponding resistor 25–2 connected in series with the lower secondary winding 21–3. The primary winding 21–1 is directly energized by the signal source 10.

When the resonant circuit is tuned to the timing wave frequency, equal and opposite currents are caused to flow through a common resistor 26 connected in shunt with the input transformer 31 so that no signal of that frequency is introduced into the repeater 30.

Figure 3:
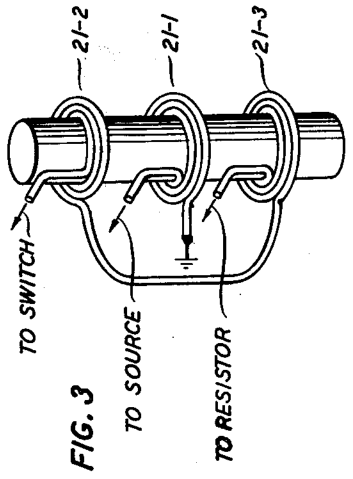
FIG. 3 is a perspective view of a balanced hybrid transformer included in the regenerative network of FIG. 1.

In order that the hybrid transformer 21 may exclude a spurious timing wave component, without hindrance to the spectral components of the incoming pulse train, the secondary windings 21–2 and 21–3 should be carefully balanced with respect to the primary winding 21–1; otherwise, the interwinding capacitances from the primary winding to corresponding positions on the secondary windings would be unequal. As illustrated by FIG. 3, transformer balance is achieved through the use of three mutually displaced winding whose turns lie in successive planes perpendicular to the transformer core. For consistency with the dot markings on the transformer diagram of FIG. 1 the upper winding is wound in a counterclockwise sense, while the two remaining windings are wound in the opposite sense. Connections from the winding terminals to the various points of the hybrid network follow the indicated legends.

Besides providing a self-derived timing wave repeater, the invention may be turned to account in the extraction of a timing wave that can be inserted into a slot in the frequency spectrum of a bipolar pulse train. For standard bipolar signals the slot occurs at the pulse repetition frequency. However, equalization of the timing wave can be facilitated and its crosstalk with the pulse signals can be reduced if the bipolar signals are interleaved in the manner taught by M. Karnaugh in application 854,820, filed November 23, 1959. Then a slot is produced at half the pulse repetition frequency.

When the timing wave is to be extracted the hybrid and timing switches 22 and 53 are placed in their secondary positions, i.e., the tongues of both switches 22 and 53 are latched to the normally unconnected lead extending from the hybrid network 20 into the repeater 30, and the timing wave extracted by the hybrid resonant circuit is applied to the zero crossing detector 55 in the way that the derived timing wave was applied previously. Of course, as before, the resistance in the path from the hybrid network 20 to the zero crossing detector 55 must balance that of the resistor 25–2 connected to the other hybrid winding 21–3. With interleaved signals the hybrid resonant circuit is tuned to a timing wave frequency that is one-half the pulse repetition rate, and a full-wave rectifier (not shown) is included in the path containing the hybrid selector switch 22.

Other adaptations of the hybrid network and of the timer-limiter transistor to a wide variety of pulse repeaters will occur to those skilled in the art.

Also apparent will be extensions of the invention to unipolar pulse repeaters as well.

What is claimed is:

1. In combination with a pulse repeater having an input and an output constituted of a transistor for regenerating pulse signals of an incoming train under the control of a timing wave, said transistor having an emitter electrode, a base electrode connected to said input and a collector electrode connected to said output, means for deriving said timing wave from said pulse signals and for limiting the current flow in said transistor comprising a transistor having an emitter, base and collector electrodes of which the collector electrode is connected to said input and the emitter electrode is connected directly to the base emitter electrode of the first named transistor and biasing means interconnecting the emitter and base electrodes of the second named transistor.

2. Apparatus as defined in claim 1 further including a zero crossing detector interconnecting the base electrode of said first named transistor with the collector electrode of said second named transistor.

3. In combination with a push-pull repeater for regenerating incoming pulse signals of a bipolar pulse train, said repeater being constituted of two like transistors having three pairs of corresponding electrodes with a first pair of corresponding electrodes connected to an input, a second pair of corresponding electrodes connected to an output and a third pair of corresponding electrodes connected in common, along with means for biasing said transistors; means for timing said repeater comprising a resonator connected to said input and means responsive to the incoming pulse signals for activating said resonator to produce a sinusoidal waveform.

4. In combination with a push-pull repeater for regenerating incoming pulse signals of a bipolar pulse train, said repeater being constituted of two like transistors having three pairs of corresponding electrodes with a first pair of corresponding electrodes connected to an input, a second pair of corresponding electrodes connected to an output and a third pair of corresponding electrodes connected in common, along with means for biasing said transistors; means for timing said repeater comprising a resonator which is responsive to the incoming pulse signals, and a zero-crossing detector interconnecting said resonator with said input.

5. In combination with a push-pull repeater for regenerating incoming pulse signals of a bipolar pulse train, said repeater being constituted of two like transistors having three pairs of corresponding electrodes with a first pair of corresponding electrodes connected to an input, a second pair of corresponding electrodes connected to an output and a third pair of corresponding electrodes connected in common, along with means for biasing said transistors; means for timing said repeater comprising a resonator connected to said input, and a hybrid network connected to said resonator and responsive to said incoming pulse signals.

6. Apparatus as defined in claim 5 wherein said hybrid network comprises a transformer having a primary winding connected to said input and a secondary winding with first, second and tap terminals, means for switching the first terminal to said resonator, and means connecting said second terminal and tap terminals to said first pair of corresponding electrodes.

7. In combination with a push-pull repeater for regenerating incoming pulse signals of a bipolar pulse train, said repeater being constituted of two like transistors having three pairs of corresponding electrodes with a first pair of corresponding electrdoes connected to an input, a second pair of corresponding electrodes connected to an output and a third pair of corresponding electrodes connected in common, along with means for biasing said transistors; means for timing said repeater comprising a resonator connected to said input and means responsive to the incoming pulse signals for activating said resonator, which activating means comprises a third transistor having one electrode connected to the electrodes of said third pair, another electrode connected to said resonator, and a third electrode connected to the biasing means.

8. Apparatus for regenerating bipolar pulse signals, which comprises an input point, two transistors of like type having electrodes coupled to said input point and connected for push-pull operation, said transistors having a pair of corresponding electrodes connected in common, means for timing said apparatus comprising a third transistor having electrodes interconnecting said input with said electrodes connected in common, and means for biasing said third transistor to be nonconducting during the presence of said pulse signals and to be conducting otherwise.

9. A bipolar pulse regenerator comprising three like transistors having base, emitter and collector electrodes, said emitter electrodes being connected to a common point, means for applying bipolar pulse signals to the base electrodes of two of the transistors, load means interconnecting the collector electrodes of said two transistors, means for applying a biasing signal between the emitter and base electrodes of the third transistor, and resonating means interconnecting the collector electrode of said third transistor with the first mentioned applying means.

10. Bipolar pulse regenerator comprising a first regenerating path containing means for amplifying pulse signals of a first polarity, a second regenerating path connected in shunt with the first and containing means for amplifying pulse signals of a second polarity, and a timing path connected in shunt with both of the regenerating paths and containing means, activated by the first and second mentioned amplifying means, for deriving a timing wave from pulse signals of both polarities and for limiting the current flow in the regenerating paths during the presence of said pulse signals.

11. A repeater for regenerating signals of an incoming pulse train under the control of a timing wave, comprising a regenerating transistor having emitter, base and collector electrodes, means for applying the incoming signals to the base electrode of said regenerating transistor, load means coupled to the collector electrode of said regenerating transistor, a feedback path extending from the emitter electrode of said regenerative transistor to said applying means, resistance means interconnecting said emitter electrode with said applying means, and amplifying means included in said feedback path and connected in shunt with said resistance means for bypassing said resistance means until the arrival of said incoming signals.

12. A bipolar pulse signal repeater, comprising first and second shunt-connected regenerating paths, a first transistor having at least three electrodes, two of which are included in the first regenerating path, a second transistor having at least three electrodes, two of which are included in the second regenerating path,
a timing path interconnecting the third electrode of said first transistor and the third electrode of said second transistor with said shunt-connected regenerating paths.
a third transistor having at least three electrodes, two of which are included in said timing path,
and means for biasing the third electrode of said third transistor with respect to one of its its electrodes included in said timing path.

13. Apparatus for regenerating bipolar pulse signals, comprising an input,
first and second transistors connected for push-pull operation with respect to said input and having a common connection,
amplifier means responsive to said signals and connected to said common connection,
and means connected to said amplifier means for producing a sustained timing wave at said input.

14. Apparatus as defined in claim 6 wherein said transformer comprises
a transformer core,
and three mutually displaced windings wound on said core substantially in successive planes perpendicular thereto, the winding corresponding to said primary winding being positioned between the other two which are joined to constitute said secondary winding.

15. Apparatus as defined in claim 3 wherein said activating means comprises
a transformer having a primary winding energized by said pulse signals and a secondary winding with a first terminal, a second terminal and a tap terminal,
a resistor connected to said input and interconnecting said second terminal with said tap terminal,
and means for switching said first terminal to said resonant circuit.

16. Apparatus for regenerating bipolar pulse signals comprising
an input transformer having a primary winding, and a secondary winding with first and second terminals and a tap terminal,
first and second regenerating transistors each having base, collector and emitter electrodes,
the base electrodes of said transistors being respectively connected to said first and second terminals,
an output transformer having a secondary winding, and a primary winding with first and second terminals and a tap terminal,
the collector electrodes of said transistors being respectively connected to the first and second terminals of said output transformer,
a third transistor having base and collector electrodes and an emitter electrode connected to the emitter electrodes of said transistors,
a resonator interconnecting the collector electrode of said third transistor with the tap terminal of said input transformer,
first biasing means connected to the tap terminal of said input transformer,
second biasing means connected to the tap terminal of said output transformer,
and means for biasing the emitter electrode of said third transistor with respect to its base electrode.

References Cited by the Examiner

UNITED STATES PATENTS

| | | | |
|---|---|---|---|
| 2,703,368 | 3/55 | Wrathall | 307—88.5 |
| 2,759,047 | 8/56 | Meacham | 328—164 |
| 2,927,967 | 3/60 | Edson | 307—88.5 |
| 2,939,018 | 5/60 | Faulkner | 307—88.5 |
| 2,992,341 | 7/61 | Andrews et al. | 307—88.5 |
| 3,011,066 | 11/61 | Vogelsong | 307—88.5 |
| 3,060,326 | 10/62 | Watson | 307—88.5 |

ARTHUR GAUSS, *Primary Examiner.*

JOHN W. HUCKERT, *Examiner.*